United States Patent
Zarris et al.

(10) Patent No.: US 7,154,662 B2
(45) Date of Patent: Dec. 26, 2006

(54) BROADBAND RAMAN AMPLIFIER

(75) Inventors: George Zarris, London (GB); Fernando Rodriguez Llorente, London (GB)

(73) Assignee: Alcatel, Paris (FR)

( * ) Notice: Subject to any disclaimer, the term of this patent is extended or adjusted under 35 U.S.C. 154(b) by 255 days.

(21) Appl. No.: 10/022,896

(22) Filed: Dec. 20, 2001

(65) Prior Publication Data

US 2002/0085268 A1  Jul. 4, 2002

(30) Foreign Application Priority Data

Dec. 22, 2000 (GB) ................................. 0031508.5

(51) Int. Cl.
*H01S 3/00* (2006.01)
(52) U.S. Cl. ..................................................... 359/334
(58) Field of Classification Search ................ 359/334, 359/337.4, 340, 341.31; 372/3, 6, 70; 398/31
See application file for complete search history.

(56) References Cited

U.S. PATENT DOCUMENTS

| | | | | |
|---|---|---|---|---|
| 4,699,452 A * | 10/1987 | Mollenauer et al. | ........... | 384/3 |
| 4,922,495 A | 5/1990 | Bobbs et al. | | |
| 5,457,568 A * | 10/1995 | Jacobovitz-Veselka et al. | .. | 359/341.3 |
| 5,524,118 A * | 6/1996 | Kim et al. | ........................ | 372/6 |
| 5,920,423 A * | 7/1999 | Grubb et al. | ........... | 359/341.33 |
| 5,959,766 A | 9/1999 | Otterbach et al. | ........... | 359/337 |
| 6,122,298 A | 9/2000 | Kerfoot, III et al. | ............. | 372/6 |
| 6,292,288 B1 * | 9/2001 | Akasaka et al. | ............. | 359/334 |
| 6,388,806 B1 * | 5/2002 | Freeman et al. | .......... | 359/341.3 |
| 6,510,000 B1 * | 1/2003 | Onaka et al. | ................. | 359/334 |
| 6,549,329 B1 * | 4/2003 | Vail et al. | .................... | 359/334 |
| 6,567,432 B1 * | 5/2003 | Kim et al. | ........................ | 372/6 |
| 6,603,595 B1 * | 8/2003 | Welch et al. | ................ | 359/334 |
| 6,606,188 B1 * | 8/2003 | Shimojoh | .................... | 359/334 |
| 6,624,926 B1 * | 9/2003 | Hayashi et al. | ............. | 359/334 |
| 6,657,774 B1 * | 12/2003 | Evans et al. | ................. | 359/334 |
| 6,717,963 B1 * | 4/2004 | Foursa | ........................... | 372/3 |

FOREIGN PATENT DOCUMENTS

| | | |
|---|---|---|
| EP | 0 984 532 A1 | 3/2000 |
| EP | 1 018 666 A1 | 7/2000 |
| WO | WO 98/02587 | 5/1998 |
| WO | WO 00/49721 * | 8/2000 |

OTHER PUBLICATIONS

Andriamonje et al. Physics Letters, vol. 348, #3-4, pp. 697-709, Apr. 6, 1995. Abstracts herewith.*
Emori et al, Electronics Letters, vol. 35, #16, pp. 355-561, Aug. 5, 1999.*
Willetts et al, IEE Colloquium. Optical Amplifiers, No. 1998/492, pp. 9-1/9-7, abstracts herewith.*
Emori et al, Furukawa Review, #19, pp. 59-62; 2000.*

(Continued)

*Primary Examiner*—Deandra M. Hughes
(74) *Attorney, Agent, or Firm*—Sughrue Mion, PLLC

(57) ABSTRACT

The present invention provides a wide bandwidth, gain flattened Raman amplifier including a laser source of pump radiation, and means for producing from the pump source a plurality of wavelengths of pump radiation including means for providing adjustable optical feedback to the pump source at a plurality of radiation wavelengths. Alternatively, instead of or in addition to the means for providing adjustable optical feedback, the invention may include means for independent power control of each wavelength.

The amplifier may include a coupler for coupling the pump radiation into the signal fiber and may include the fiber (which can be the transmission fiber) where the amplification takes place.

13 Claims, 2 Drawing Sheets

OTHER PUBLICATIONS

Hecht et al. Understanding Fiber Optics. 2nd Edition. SAMS Publishing. 1993. p. 419.*

Agrawal, Govind P. Fiber-Optic Communication Systems, 2nd Edition. John Wiley & Sons, Inc. 1997. pp. 379-385.*

H. Masuda et al, "1.65 μm band fibre Raman amplifier pumped by wavelength-tunable amplified spontaneous emission light source" Electronics Letters, Nov. 26, 1998, vol. 34, No. 24 pp. 2339.

* cited by examiner

BROADBAND RAMAN AMPLIFIER

BACKGROUND OF THE INVENTION

The present invention relates to optical amplifiers and in particular to wide bandwidth optical amplifiers. The present invention is particularly applicable to Raman amplifiers.

Raman amplification is considered to be particularly suitable for use in wideband and ultra wideband optical amplifiers, for example used in wavelength division multiplexing transmission systems. The reason for this is that, unlike Erbium doped fibre amplifiers, gain can be provided at a predetermined range of wavelengths by choosing a suitable pump wavelength. In addition, Raman amplification can be distributed along a transmission fibre, giving an improved optical signal-to-noise ratio, lower signal launch power and therefore longer transmission distances without requiring further amplification and/or repetition.

However one drawback is that for a Raman amplifier using a single pump wavelength only, the gain profile of the amplifier is far from flat. Typically the gain profile will be a curve with a peak at the wavelength chosen for maximum amplification. Often it is desirable for the amplifier to operate adequately over a range of wavelengths and so in order to improve the flatness of the amplifier gain profile over a wide range of wavelengths, several pump sources may be used.

FIG. 1 shows a prior art wideband Raman optical amplifier. In FIG. 1, a signal to be amplified is input to fibre 2. In addition, pump radiation is provided to fibre 2 through the signal and pump coupler 4. The resulting amplified signal is output on fibre 6. N different pump sources (generally indicated 8) are provided and each pump source produces pump radiation of a different wavelength from the other pump sources i.e. pump radiation of wavelengths $\lambda 1$, $\lambda 2$, $\lambda 3 \ldots \lambda N$ are provided.

All the sources of pump radiation are fed to a multiplexer 10 which multiplexes the pump sources and transmits the resulting wideband wavelength pump radiation to the signal and pump coupler 4. In this way, signals travelling on the fibre connected to the signal coupler 4 may be amplified.

This solution is based on the assumption that the Raman gain which results from these multiple pumps is close to the superposition of the Raman gains which would result from the use of each of the pump sources individually. Therefore, by choosing appropriate pump wavelengths, powers and taking into account interpump amplification a reasonably flat gain profile can be achieved over a predetermined wavelength band.

SUMMARY OF THE INVENTION

However this solution has a number of drawbacks mainly resulting from the fact that more than one pump source is required. Firstly, pumps are expensive components and secondly the inclusion of a number of pumps will substantially increase the size of the amplifiers. Also the use of a number of pumps will increase the pump driving current requirements, which can be particularly restrictive where the amplifier is for use in submarine fibre optical cable systems where the line current has to be kept reasonably low. Furthermore, in systems where higher reliability is needed, the number of redundant pumps included may be as high as the number of working pumps which in turn exaggerates the problems of cost, size and complexity for the amplifier.

The present invention aims to provide a pump laser for Ramon amplification which mitigates some or all of these problems.

Accordingly, in a first aspect, the present invention provides a wide bandwidth, gain flattened Raman amplifier including a laser source of pump radiation, and means for producing from the pump source a plurality of wavelengths of pump radiation including means for providing adjustable optical feedback to the pump source at a plurality of radiation wavelengths. Alternatively, instead of or in addition to the means for providing adjustable optical feedback, the invention may include means for independent power control of each wavelength.

The amplifier may include a coupler for coupling the pump radiation into the signal fibre and may include the fibre (which can be the transmission fibre) where the amplification takes place.

Thus by producing multiple wavelength pump radiation from a single pump source, the number of pump sources which need to be provided can be reduced. Preferably only one pump source is included although in some circumstances more than one pump source may be provided with each pump source producing a plurality of different wavelengths of pump radiation. Also further pump source(s) may need to be provided for the purposes of redundancy.

Preferably the means for producing the pump radiation includes one or more reflectors, for example gratings. Preferably each reflector produces optical feedback to the pump at one wavelength and the characteristics of the reflectors are selected such that each reflector produces optical feedback at an appropriate wavelength, typically different to the wavelengths produced by the other reflectors.

Preferably the amplifier includes control means for controlling the optical feedback e.g. by selecting one or more wavelengths and/or attenuating radiation of selected wavelength(s).

Preferably the control means includes one or more variable optical attenuators and most preferably there is a separate variable attenuator for each reflector. In one embodiment, at least some radiation from more than one reflector is coupled simultaneously back into the pump to produce a plurality of pump radiation wavelengths. The pump radiation thus produced, at a plurality of wavelengths, is coupled into the signal path via the signal and pump coupler 4. In this way, a wideband optical amplifier can be provided still using fewer (and preferably only one) pump source of pump radiation. In such embodiments, the amount of attenuation provided by each variable optical attenuator may be suitably selected so as to provide an appropriate level of optical feedback to the pump at the corresponding reflector wavelength. Thus, the pump will provide pump radiation at each reflector wavelength, of magnitude which depends on the optical feedback at that wavelength. By controlling the optical feedback from each reflector, a desirable pump radiation spectrum can be achieved so as to provide an appropriate overall gain profile for the amplifier. For example, one desirable gain profile may be a flat response but in certain circumstances other profiles may be desired. The characteristics of each variable attenuator may be determined or alternatively control means may be provided for controlling and/or adjusting the attenuation of each variable optical attenuators depending on the circumstances.

In some embodiments, rather than providing continuously variable levels of attenuation (or even a plurality of separate discrete levels of attenuation), each variable attenuator may only provide one level of attenuation. That is to say, for example, each variable optical variable attenuator may in fact be an optical switch providing either substantially no attenuation or substantially 100% attenuation depending on the setting of the switch. In such embodiments, the switches may be set so that only some, or indeed only one, of the reflectors provides optical feedback to the pump at any one time. In this way it is possible to provide a discretely wavelength tuneable amplifier spectrum using fewer (and preferably only one) pump source. Again, control means may be provided for selectively controlling the switches in order to change the overall characteristics of the amplifier.

Preferably the pump source is operated under the so-called "coherence collapse" regime so that it is possible that a single pump laser is locked onto a multiple number of wavelengths. This is particularly suitable for the embodiment using the variable attenuators. Preferably the pump source is temperature stabilised, in order for its gain spectrum to remain unaltered during its operation.

Alternatively, instead of having to temperature stabilise the pump source, variations in the output power of the laser with temperature could be compensated by controlling the input current supplied to the laser. This is particularly suitable with the second embodiment described above utilising the optical switches.

In a second aspect, the present invention provides a method of providing a wide bandwidth Raman amplifier including the step of producing from a laser pump source, a plurality of wavelengths of pump radiation by providing adjustable optical feedback at these wavelengths.

BRIEF DESCRIPTION OF THE DRAWINGS

Embodiments of the present invention will now be described by way of example with reference to the accompanying drawings in which.

DETAILED DESCRIPTION OF EMBODIMENTS

Figure 1:
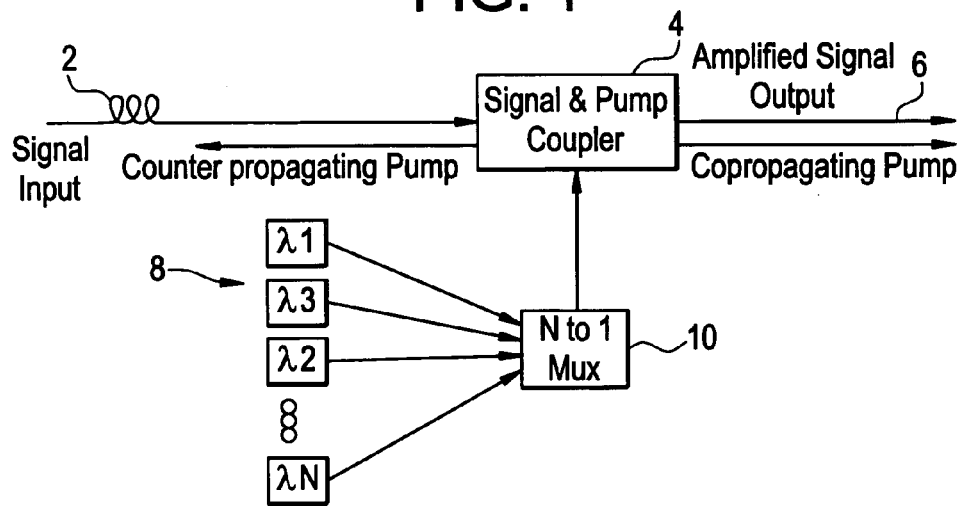
FIG. 1 is a schematic diagram of a prior art optical amplifier.
Figure 2:
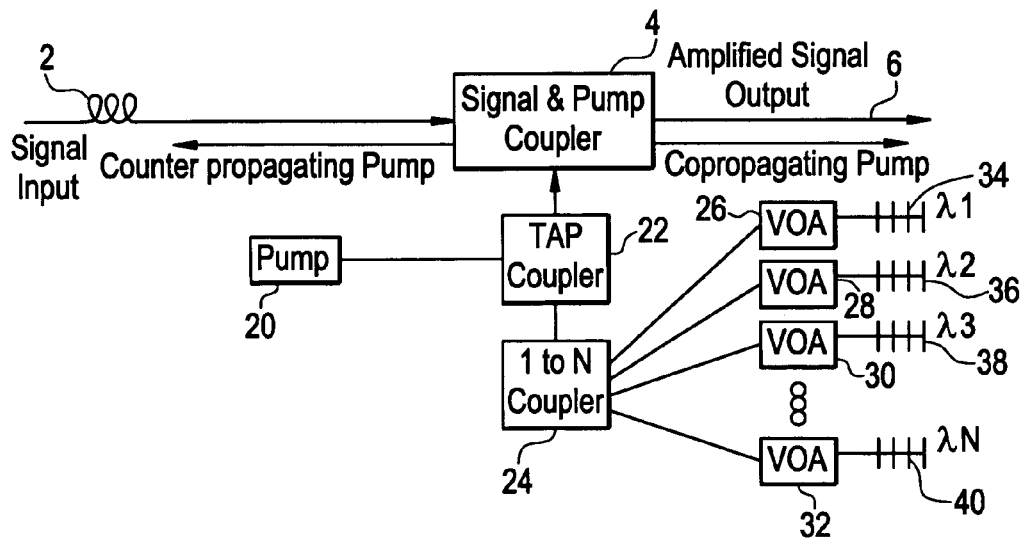
FIG. 2 is a schematic diagram of a first embodiment of an optical amplifier according to the present invention.

In FIG. 2, a signal to be amplified is input along transmission fibre 2. Pump radiation is provided to fibre 2 via the signal and pump coupler 4. Raman amplification is taking place in fibre 2 and the amplified signal is output on a fibre 6. A single pump 20 is provided which preferably produces pump radiation of substantially wide bandwidth. The pump radiation is fed to a TAP coupler 22 which in turn feeds the pump radiation to a further coupler 24.

The coupler 24 couples the pump radiation to a plurality of variable optical attenuators. In FIG. 2 only four optical attenuators 26, 28, 30, 32 are illustrated but of course any number may be included. Each of the optical attenuators 26–32 is associated with a respective reflector 34–40. The reflectors can, for example, be fibre Bragg gratings. Each grating 34–40 produces reflected radiation of correspondingly different wavelengths, which is shown in FIG. 2 as $\lambda 1$, $\lambda 2$, $\lambda 3$ and $\lambda N$ (indicating the possibility for N pump wavelengths).

The amount of reflection radiation produced by each reflector and fed back to coupler 24 is controlled by each of the respective variable optical attenuators 26–32.

The combined resulting reflection radiation is then fed to the pump to provide external optical feedback. The parameters of some or all of the variable optical attenuators may be controlled to vary the overall pump radiation spectrum. In this way, a multi wavelength wideband pump of variable characteristic can be provided. The multiwavelength pump radiation thus produced—by optical feedback from a number of reflections at different wavelengths—is fed through the coupler 22 and signal and pump coupler 4 into the transmission fibre 2, where the signal amplification takes place.

Figure 3:
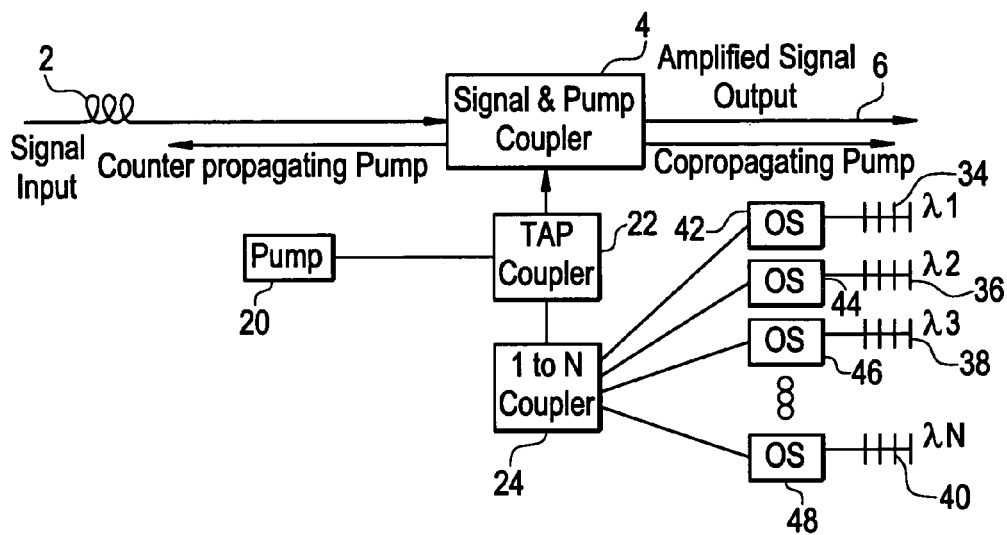
FIG. 3 is a second embodiment of an optical amplifier according to the present invention.

FIG. 3 shows a second embodiment of an amplifier according to the present invention. The structure is similar to the embodiment of FIG. 2 and like numbers have been used for like items of equipment. However, in this embodiment the variable optical attenuators 26–32 of FIG. 2 have been replaced by optical switches 42, 44, 46 and 48. Again, only four optical switches are shown but any suitable number may be used. In this embodiment, the optical switches may be operated so that only some, or indeed only one, of the radiation reflectors are operatively connected to the pump at any one time. In this way, a discretely wavelength tuneable pump is provided.

Figure 4:
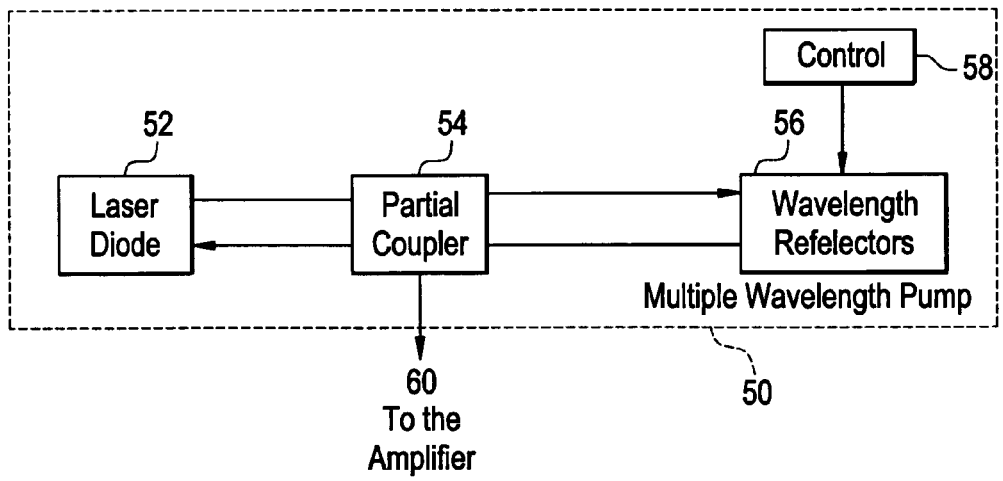
FIG. 4 is a third embodiment of an optical amplifier according to the present invention.

FIG. 4 is a schematic diagram showing an embodiment of the present invention in generic terms. A multiple wavelength pump (generally indicated by numeral 50) consists of a laser diode 52 coupled to a partial coupler 54 which is in turn coupled to means for providing adjustable optical feedback 56 under the control of control means 58. In use, as has been previously described, the means 56 is used to produce from the laser pump source 52 a plurality of wavelengths of pump radiation which may then be coupled to an amplifier 60 (not shown in FIG. 4).

The above embodiments are given by way of example only and variations will be apparent to those skilled in the art.

The invention claimed is:

1. A wide bandwidth Raman amplifier comprising:
   at least one multiwavelength wideband laser pump having a single excitation laser source and means for producing from said pump source a plurality of different radiation wavelengths, and
   means for adjustable independent power control of each of the plurality of different radiation wavelengths.

2. An amplifier according to claim 1, further comprising a plurality of multiwavelength wideband laser pumps, each multiwavelength wideband laser pump producing a wideband pump radiation signal having a plurality of different radiation wavelengths.

3. An amplifier according to claim 1, wherein the means for power control of each radiation wavelength comprises at least one variable optical attenuator.

4. An amplifier according to claim 3, further comprising control means for controlling and/or adjusting the attenuation of the at least one variable optical attenuator.

5. An amplifier according to claim 1 wherein at least some radiation of more than one wavelength is coupled to the signal to be amplified.

6. A wide bandwidth Raman amplifier comprising:
   a multiwavelength wideband laser pump producing a wideband pump radiation signal having a plurality of different radiation wavelengths, and
   means for adjustable independent power control of each of the plurality of different radiation wavelengths of said wideband pump radiation signal produced by said multiwavelength wideband laser pump, wherein the means for independent power control comprises one or more reflectors.

7. An amplifier according to claim 6 wherein each reflector produces optical feedback to the multiwavelength wideband laser pump at a respective different one of said plurality of wavelengths.

8. An amplifier according to claim 6 wherein there is a separate variable attenuator for each reflector.

9. A wide bandwidth Raman amplifier comprising:
   at least one multiwavelength wideband laser pump having a single excitation laser source and producing from said pump source a plurality of different radiation wavelengths, and
   means for adjustable independent power control of each of the plurality of different radiation wavelengths, wherein the means for independent power control comprises at least one optical switch providing either substantially no attenuation or substantially 100% attenuation depending on the setting of the switch.

10. An amplifier according to claim 9, further comprising control means for selectively controlling the at least one switch to change the overall characteristics of the amplifier.

11. A method of providing a wide bandwidth Raman amplifier, wherein the method comprises producing, from a laser excitation source, a wideband pump radiation signal by providing means for independently adjusting optical feedback to the laser pump at a plurality of different wavelengths.

12. A wide bandwidth Raman amplifier producing a wideband pump radiation signal having a plurality of different wavelength components from a laser excitation source, said amplifier comprising means for independently adjusting the magnitudes of a plurality of different wavelength components of said wideband pump radiation signal to alter the amplifier gain profile during amplifier operation.

13. A wide bandwidth Raman amplifier including only one laser pump source of pump radiation, and means for producing from the pump source a wideband pump radiation signal having a plurality of different wavelength components, said means for producing including:
   means including at least one reflector for adjustable independent power control of plural of said different radiation wavelengths wherein each reflector produces optical feedback to the pump source at a different one of said wavelengths.

* * * * *